United States Patent Office 3,440,891
Patented Apr. 29, 1969

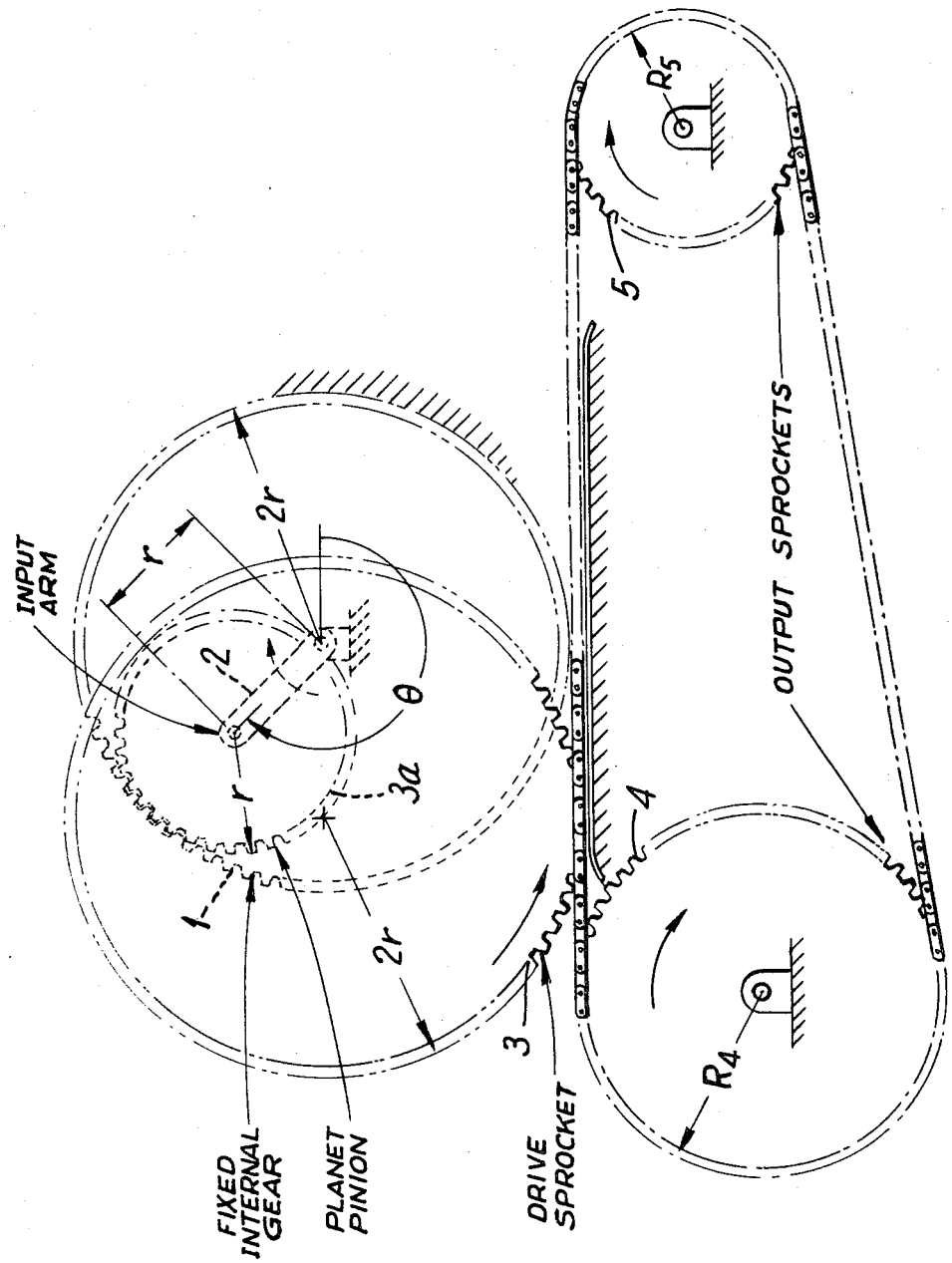

3,440,891
INTERMITTENT MOTION CHAIN MECHANISM
Ferdinand Freudenstein, 3720 Independence Ave., Bronx, N.Y. 10463, and Charles W. McLarnan, 1984 Edgemont Road, Columbus, Ohio 43212
Filed Jan. 9, 1967, Ser. No. 608,191
Int. Cl. F16h 27/04
U.S. Cl. 74—84          2 Claims

ABSTRACT OF THE DISCLOSURE

This invention relates to an improved chain type intermittent motion mechanism having a driving sprocket and a movable gear rigidly fastened to the sprocket. A fixed gear having a diameter equal to the diameter of the sprocket and doubled that of the moving gear is coupled by an input arm.

---

My invention relates to an intermittent motion chain mechanism.

The industrial application of intermittent-motion mechanisms involving a link chain as one of its basic components appears to be of relatively recent origin. There are two basic types: in the first, or *linkage type*, the motion is governed in part by one or more links, connecting a constant-speed chain to the output shaft; in the second or geared type, the motion of the output shaft is directly proportional to the speed of the chain, which now, however, is variable. This invention, in general, is of the second type.

Intermittent-motion mechanisms are among the oldest and most ingenious forms of mechanism, having been used in watches and other devices for many years. In prior linkages a link dyad (two pin-connected links) serves to connect a point on the moving chain to the output shaft. The variable rotation of the links modifies the motion of the chain so as to impart a variable motion (dwell) to the output shaft, for example, with reference to sheet delivery on a printing press.

A different approach, embodied in the geared types, involves a chain which is mounted on gear-driven and free-wheeling sprockets. The driving sprocket is keyed eccentrically to the driving gear in such a fashion that the pitch circle of the sprocket passes through the center of rotation of the driving gear. Provided the arrangement of the gears and sprockets is such that the belt length remains substantially constant, the variable output motion is obtained by the fluctuation in chain speed imparted to the chain by the eccentrically mounted driving sprocket. A successful drive of this kind is marketed by the Remmele Engineering Company of St. Paul, Minn.

Many prior intermittent chain mechanisms, however, have had finite dwell times, discontinuous accelerations as well as constructional difficulties.

An object of this invention is to provide an improved intermittent motion chain mechanism.

A further object is to provide a mechanism in which the direction of input and output rotations may be either the same or opposite.

A still further object of this invention is to provide a mechanism in which the duration of dwell is instantaneous.

Still another object of this invention is to eliminate discontinuous accelerations.

The above mentioned and other features and objects of this invention and the manner of attaining them will become more apparent and the invention itself will best be understood by reference to the following discription of an embodiment of the invention taken in conjunction with the accompanying drawing wherein:

The single figure is a diagram illustrating a sectional view showing the relationship of the elements of this invention.

In the mechanism shown in the drawing, the internal gear 1, is the fixed member. An arm 2, whose fixed pivot coincides with the center of the fixed gear 1, and whose length is equal to one half the pitch radius of gear 1, carries a planet pinion 3a, pivoted at the moving pivot on the arm 2. The pinion 3a meshes with the fixed internal gear 1, and its pitch radius is one half that of the fixed internal gear 1. This structure is the familiar cardanic motion. Sprocket 3, whose pitch radius must be equal to that of the fixed gear 1, mounted rigidly on pinion 3a, such that the center of sprocket 3 lies on the pitch circle circumference of the planet pinion 3a. The sprocket 3a drives the chain 6, mounted on the output sprockets 4 and 5, which rotate in fixed centers.

The operation of the device is as follows: The center of sprocket 3 moves on a theoretically exact, straight line passing through the center of fixed internal gear 1, thereby enabling the sprocket to drive a linear portion of a chain. If the diameter of sprocket 3 is equal to the diameter of the fixed internal gear, the motion of the chain will be unidirectional, but with a dwell. More specifically, the velocity, $V_c$, of the point on the sprocket in contact with the chain can be expressed as $$V_c = 2(1 - \sin \theta) r \dot\theta$$

where $r$, $\theta$ are as shown. Thus the chain will have an instantaneous dwell when $\theta = 90°$, and the velocity will be unidirectional at all other times. The equations of motion are:

$$x = 2r(\theta + \cos \theta - 1)$$
$$\dot x / \dot\theta = 2r(1 - \sin \theta)$$
$$\ddot x / \dot\theta^2 = -2r \cos \theta$$

where $x$ denotes the displacement of a point on the chain from the position at which $\theta = 0$.

The angular motion of either sprocket 4 or sprocket 5 (whichever is the follower) is obtained by dividing the linear displacement $x$ by the radius of that sprocket. Hence, the total follower travel between dwells is $$4\pi \frac{r}{R_4} \text{ or } 4\pi \frac{r}{R_5}$$

radians. If the drive is located as shown, input and output members rotate in the same direction. If the gear mechanism is placed inside the chain as may be desirable for space conservation and dynamic balancing, the rotations of input and output are in opposite directions. The instantaneous dwell occurs when the output acceleration is zero, and there are no discontinuities in the output acceleration.

Although the present invention has been described in conjunction with a preferred embodiment, it is to be understood that modifications and variations may be resorted to without departing from the spirit and scope of the invention as those skilled in the art will readily understand.

Among such modifications are the production of the cardanic motion of the drive sprocket by other well known methods not using an internal gear, and modifications of the size of the drive sprocket so that the output motion either reverses momentarily or slows without stopping.

What is claimed is:
1. A mechanism comprising
   a driving sprocket,
   a movable gear rigidly fastened to said sprocket, the center of said sprocket being coincident with a point on the circumference of said gear,
   a fixed gear having a diameter equal to the diameter of said sprocket,
   an input arm, having a stationary end and a rotatable end and a length equal to the diameter of the moving gear, the rotatable end being fastened for driving engagement with said movable gear, said movable gear meshing with said fixed gear,
   the stationary end being coincident with the center of said fixed gear.

2. The mechanism of claim 1 including a chain driven by said sprocket, two output sprockets coupled to said chain, said sprockets mounted on fixed centers and meshing with said chain.

References Cited

UNITED STATES PATENTS 2,754,687   7/1956   Brandon _____ 74—52

MILTON KAUFMAN, *Primary Examiner.*